Sept. 24, 1946.    H. V. ATWELL    2,408,187
CATALYST MANUFACTURE
Filed May 18, 1944
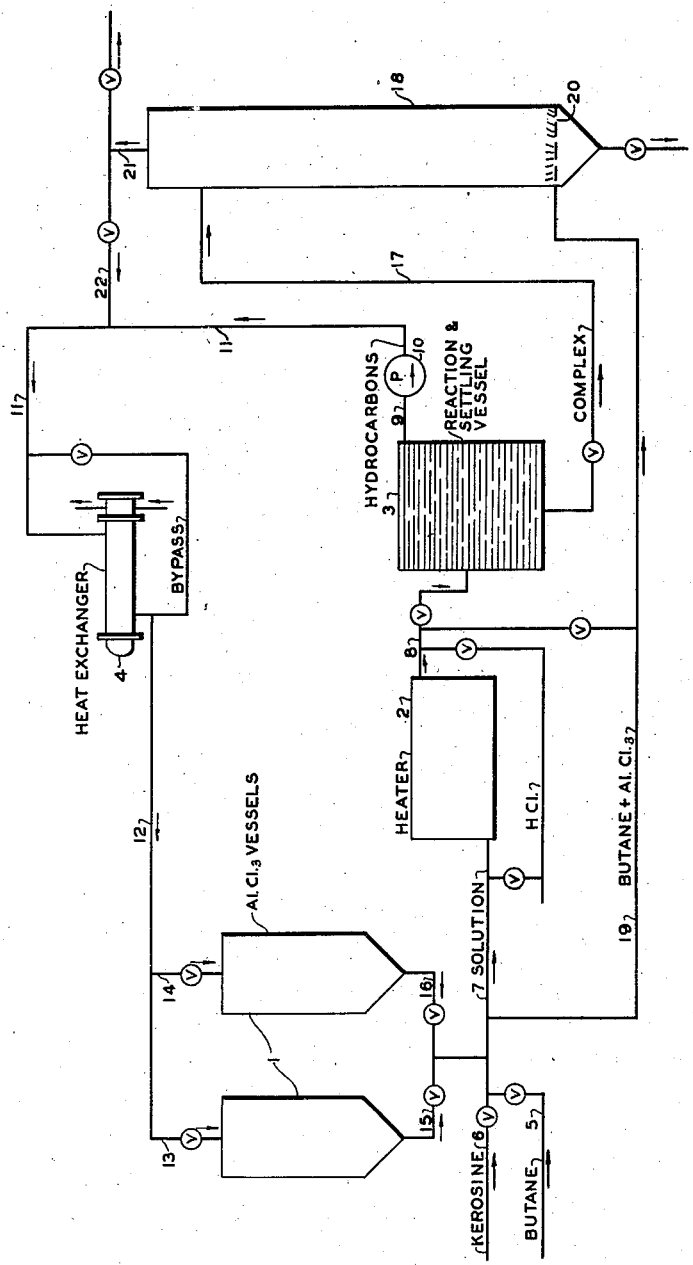
HAROLD V. ATWELL
INVENTOR
BY 
HIS ATTORNEY Patented Sept. 24, 1946

2,408,187

UNITED STATES PATENT OFFICE 2,408,187

CATALYST MANUFACTURE

Harold V. Atwell, Beacon, N. Y., assignor to The Texas Company, New York, N. Y., a corporation of Delaware Application May 18, 1944, Serial No. 536,089

3 Claims. (Cl. 252—254)

The present invention relates to catalyst manufacture, and particularly to a complex liquid catalyst formed by reacting a solid metal halide, such as aluminum chloride, with a normally liquid hydrocarbon in the presence of a promoter such as hydrogen halide.

Complex compounds formed by reacting a metal halide with a petroleum hydrocarbon in the presence of a promoter are useful as catalysts for effecting catalytic conversion of hydrocarbons such as conversion processes involving alkylation and isomerization. The metal halide may be reacted with various types of hydrocarbons including olefins, paraffins, naphthenes, and aromatics. A mixture of reactant hydrocarbons may be employed, as for example, kerosine or some other fraction of petroleum.

In accordance with the invention the solid metal halide is maintained in a contact zone in lump or granular form. A stream of saturated $C_4$ hydrocarbon in liquid phase is passed through the contact zone in contact with the solid metal halide under conditions such as to effect solution of a small amount of the metal halide in the liquid stream. The effluent stream from the contact zone containing dissolved metal halide is subjected to elevated temperature in the presence of hydrogen halide and also in the presence of the normally liquid reactant hydrocarbon in a second zone so as to effect complex formation between the metal halide and the normally liquid reactant hydrocarbon.

The reactant hydrocarbon may be commingled with the $C_4$ hydrocarbon stream prior to, or subsequent to, its passage through the contact zone, although the latter is advantageous, as will be explained later.

The mixture of metal halide and reactant hydrocarbons remain in the second zone for sufficient time to permit complex formation.

The resulting mixture of hydrocarbons containing complex also undergoes settling so as to effect phase separation between complex and unreacted hydrocarbons. The hydrocarbon phase comprising mainly $C_4$ hydrocarbons is drawn off in a continuous stream and recycled through the contact zone to dissolved additional metal halide after which it again passes through the reaction and phase separation zones. The cyclic operation is conducted to effect substantial formation of complex.

Complex compounds have been prepared heretofore by charging a quantity of hydrocarbon oil, metal halide, and promoter to a reaction vessel and subjecting the entire mixture to heating and stirring in a batch type of operation.

The present invention involves a substantial improvement over the prior art since it provides for effecting solution of solid metal halide in a solvent hydrocarbon under conditions such that substantially no complex formation occurs and then effecting reaction between the dissolved halide and reactant hydrocarbons in a separate zone. The invention thus permits segregating the complex substantially as rapidly as it is formed and also permits effecting contact between the solvent hydrocarbon and the solid metal halide in the substantial absence of complex.

An advantage of the process of the present invention is that it avoids pumping and circulation of complex, which is particularly advantageous from the standpoint of reducing corrosion and erosion of equipment; for example, one serious difficulty experienced in pumping complex with a reciprocating type of pump is that the complex penetrates the packing glands and solidifies therein ultimately causing substantial leakage as well as injury to the pump.

Moreover, the avoidance of the presence of complex in the solution zone permits more effective contact between the solvent hydrocarbon and the solid metal halide so that a uniform rate of solution is realized.

The invention also involves a further advantage as regards the preparation of complex from a metal halide such as aluminum chloride. Aluminum chloride is relatively more soluble in butane than it is in higher molecular weight hydrocarbons. Thus, at a temperature of about 200° F. normal butane dissolves about 1.75% aluminum chloride by weight of the butane while normal hexane at the same temperature dissolves only about 0.33%. Normal butane at a temperature of 140° F. dissolves about 0.55% by weight of aluminum chloride while normal hexane at the same temperature dissolves only about 0.16%. Consequently, either normal or isobutane or a mixture of both is used in the present invention to effect solution of the solid metal halide and to transfer the dissolved metal halide into the reaction zone for reaction with kerosine in which the halide is much less soluble.

The invention also contemplates fortifying the complex by subjecting it to contact with a stream of butane containing dissolved metal halide, contact being continued until the complex has extracted metal halide from the solvent hydrocarbon to the extent desired, as will be described later.

In order to describe the invention in more detail, reference will now be made to the accompanying drawing which comprises a diagram of flow useful in preparing a complex of aluminum chloride and kerosine hydrocarbons.

In the drawing the numeral 1 designates a pair of vessels packed with solid aluminum chloride in the form of particles or lumps ranging from about ¼ to ⅜ inch in diameter. Two vessels are provided so that when one is onstream the other is offstream for recharging with fresh aluminum chloride.

The numeral 2 designates a heating zone which may comprise a tubular heater wherein the mixture of hydrocarbons and dissolved aluminum chloride is raised to the temperature required for effecting complex formation.

The numeral 3 designates a reaction and settling vessel.

The numeral 4 designates a heat exchanger through which the unreacted hydrocarbons are recycled from the vessel 3 to either of the vessels 1.

An operation in which a butane stream containing kerosine is circulated through the system will be described first.

At the outset and assuming that the vessels 1 are packed with solid aluminum chloride, the system is filled with a mixture of butane and kerosine, the pressure being sufficient to maintain the butane in liquid phase. The kerosine may amount to about 10 to 15% by volume of the butane. The butane and kerosine are drawn from sources not shown through pipes 5 and 6 respectively and discharged into pipe 7 which leads to the heater 2. The heater 2 is operated so as to heat the hydrocarbon stream to a temperature in the range 200 to 300° F. The heated stream passes through pipe 8 into the vessel 3. When the vessel 3 becomes filled with liquid, the overflow is conducted through pipe 9 by pump 10 which discharges into pipe 11.

The pipe 11 communicates with the heat exchanger 4 which in turn discharges into pipe 12.

The pipe 12 communicates with branch pipes 13 and 14 leading to the vessels 1.

In this way the hydrocarbon stream is introduced to the top of either of the aluminum chloride vessels and flows downwardly therethrough discharging through pipes 15 and 16 as the case may be, which in turn communicate with the previously mentioned pipe 7.

Once the system has become filled with hydrocarbon liquid, the introduction of further hydrocarbons may be discontinued. Under such conditions the butane and unreacted kerosine are continuously recirculated through the system until substantially all of the kerosine present is converted to complex. In actual operation it is contemplated that the effluent stream from the aluminum chloride vessels 1 will contain a small amount of dissolved aluminum chloride and will be substantially free from complex. Any required makeup promoter is added to this stream either prior to or subsequent to its passage to the heater 2. The heating temperature and the amount of promoter are correlated to effect substantially complete reaction between the dissolved aluminum chloride and kerosine hydrocarbons. The reaction to form complex takes place substantially entirely in the vessel 3 which is of sufficient capacity to permit a substantial reaction time, namely, about 30 to 60 minutes.

The resulting complex settles out and accumulates in the bottom of the vessel 3, while the butane and unreacted kerosine accumulate as a hydrocarbon layer in the upper portion of the vessel 3.

The butane may undergo isomerization so that ultimately the $C_4$ hydrocarbons in the circulating mixture will comprise an equilibrium mixture of iso and normal butane. The reaction conditions of time and temperature are such that only a very limited amount of the butane enters into complex formation with the aluminum chloride.

The hydrocarbon phase separating in the vessel 3 is continuously drawn off through the pipe 9 and forced by the pump 10 through the pipe 11 to the heat exchanger 4 wherein the temperature of the hydrocarbons may be reduced if desired to a temperature in the range 150 to 200° F. On the other hand, the heat exchanger 4 may be bypassed as indicated.

It is contemplated maintaining a relatively short time of contact between hydrocarbons and solid aluminum chloride in the aluminum chloride vessels 1 so that the action taking place therein is essentially that of solution rather than complex formation. Reducing the temperature of the recycled hydrocarbons in the exchanger 4 is a further means of inhibiting complex formation in the vessel 1.

The circulation of hydrocarbons through the system is continued until substantially all of the kerosine present is converted to complex. The complex may be retained in the vessel 3 until the entire batch of kerosine charged is reacted. On the other hand, the complex may be drawn off continuously or intermittently if desired.

A modified form of operation involves charging the system first with butane and then adding the kerosine in small amounts to the circulating butane stream. In this type of operation the kerosine addition to the circulating stream may be regulated so as to provide approximately the amount of kerosine required to react with the dissolved aluminum chloride in the stream passing to the heater 2. This method of operation avoids circulating unreacted kerosine through the aluminum chloride vessels 1 or at least reduces the amount so circulated to a minimum.

By circulating the hydrocarbon stream in the foregoing manner through the solution vessels complex formation therein can be substantially entirely avoided since under the conditions prevailing therein butane does not enter into complex readily.

The complex formed in the vessel 3 may be drawn off through a pipe 17 to a tower 18 for the purpose of fortifying it with additional aluminum chloride. The complex is advantageously disposed as a static column of liquid in the tower 18. A stream of butane containing dissolved aluminum chloride is drawn off from the vessels 1 and conducted through pipe 19 which terminates in a suitable distributor 20 positioned within the bottom of the tower.

The butane stream is thus dispersed within the static column of liquid and rises upwardly therethrough. In doing so the complex extracts aluminum chloride from the butane stream until the complex becomes saturated.

In this way a complex suitable as an isomerization catalyst may be prepared. For example, a complex catalyst effective for isomerizing normal butane is characterized by having a heat of hydrolysis of about 300 to 330 small calories per gram of complex. The complex leaving the vessel 3 may have a heat of hydrolysis of only about 200 to 280 calories. Consequently, its heat of hydrolysis may be raised by fortifying in the tower 16 as already described. This fortifying action is advantageously carried out at a temperature of about 200° F.

During the fortifying action the effluent stream of butane may be discharged from the tower 18 through a pipe 21 and passed all or in part to pipe 22 communicating with the previously mentioned pipe 11.

The fortifying stream of butane and dissolved aluminum chloride may be passed through the heater 2 prior to introduction to the tower 18 in order to maintain the required temperature conditions in the tower 18.

The collecting and fortifying of the complex may, if desired, be carried out in a single chamber or vessel.

While specific mention has been made of forming a complex from aluminum chloride, it is contemplated that other solid metal halides of the Friedel-Crafts type, such as aluminum bromide and zirconium chloride, may be used. Likewise, other hydrocarbons or hydrocarbon mixtures than kerosine may be used. However, from the standpoint of making a complex catalyst effective for isomerizing normal paraffins such as normal butane, it is desirable to employ a non-aromatic hydrocarbon.

Obviously many modifications and variations of the invention as above set forth may be made without departing from the spirit and scope thereof, and therefore only such limitations should be imposed as are indicated in the appended claims.

I claim:

1. A method of preparing a complex catalyst formed by reacting aluminum chloride with kerosine hydrocarbons in the presence of hydrogen halide which comprises maintaining aluminum chloride in solid granular form in a contact zone, passing a saturated aliphatic $C_4$ hydrocarbon in liquid phase through the contact zone in contact with said chloride, effecting solution of a small amount of chloride at a temperature below about 200° F. in the $C_4$ hydrocarbon under conditions such that substantially no complex formation occurs, passing the resultant solution to a reaction zone, subjecting the dissolved chloride to contact in said reaction zone with said kerosine hydrocarbons in the presence of hydrogen chloride at a temperature in the range about 200 to 300° F. such that dissolved chloride enters into complex formation with kerosine hydrocarbons, separating resulting complex from $C_4$ and unreacted kerosine hydrocarbons removing from the reaction zone a hydrocarbon phase consisting mainly of $C_4$ hydrocarbons and substantially free from complex, recycling said hydrocarbon phase to the contact zone, and continuing the cyclic operation to effect substantial conversion of kerosine hydrocarbons to aluminum chloride-hydrocarbon complex.

2. A method of preparing a complex catalyst formed by reacting aluminum chloride with kerosine in the presence of hydrogen halide which comprises maintaining in a contact zone aluminum chloride in solid granular form, circulating through said contact zone in contact with the solid halide a stream of liquid hydrocarbons comprising a major portion of saturated aliphatic $C_4$ hydrocarbon and a minor portion of kerosine, effecting contact between solid halide and hydrocarbons under conditions of time and temperature such that solution of a small amount of aluminum chloride in $C_4$ hydrocarbons occurs without substantial complex formation, passing said stream of solution to a reaction zone, subjecting it therein to elevated temperature in the range of about 200 to 300° F. and in the presence of hydrogen halide such that dissolved aluminum chloride reacts with kerosine hydrocarbons to form complex, separating resulting complex from the unreacted hydrocarbons including $C_4$ hydrocarbons, recycling the hydrocarbons from which complex has been separated to the contact zone, and continuing the circulation of hydrocarbons to effect substantial conversion of said kerosine hydrocarbons to complex.

3. A method of preparing a complex catalyst formed by reacting aluminum chloride with kerosine in the presence of hydrogen halide which comprises maintaining in a contact zone aluminum chloride in solid granular form, circulating through said contact zone in contact with the solid halide a stream of saturated aliphatic $C_4$ hydrocarbons in liquid phase, effecting contact between solid halide and $C_4$ hydrocarbons under conditions of time and temperature such that solution of a small amount of aluminum chloride in $C_4$ hydrocarbons occurs without substantial complex formation, thereafter passing the circulating stream containing dissolved aluminum chloride to a reaction zone, adding to the stream, passing to said reaction zone a small amount of kerosine, subjecting the dissolved chloride to contact with the kerosine in the presence of hydrogen halide at elevated temperature such that dissolved aluminum chloride reacts with kerosine to form complex, separating resulting complex from the unreacted hydrocarbons including $C_4$ hydrocarbons, recycling the hydrocarbons from which complex has been separated to the contact zone, and continuing the circulation of hydrocarbons to effect substantial conversion of kerosine hydrocarbons to complex.

HAROLD V. ATWELL.